US007571126B2

(12) United States Patent
Nguyen et al.

(10) Patent No.: US 7,571,126 B2
(45) Date of Patent: Aug. 4, 2009

(54) SYSTEM AND METHOD FOR DOCUMENT PROCESSING OPERATION ACCOUNTING

(75) Inventors: Truc Nguyen, San Diego, CA (US); Michael Yeung, Mission Viejo, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 592 days.

(21) Appl. No.: 11/197,458

(22) Filed: Aug. 4, 2005

(65) Prior Publication Data

US 2005/0273403 A1    Dec. 8, 2005

Related U.S. Application Data (63) Continuation-in-part of application No. 09/970,133, filed on Oct. 3, 2001, now Pat. No. 7,430,605.

(51) Int. Cl.
*G07B 17/00* (2006.01)
*G07F 19/00* (2006.01)

(52) U.S. Cl. .................. 705/30; 358/1.13; 358/1.14; 358/1.15; 705/32; 705/52; 705/400

(58) Field of Classification Search .............. 705/30, 705/34, 52; 358/1.14, 1.15; 709/223, 227; 235/380; 400/613
See application file for complete search history.

(56) References Cited

U.S. PATENT DOCUMENTS

| 5,014,088 | A | | 5/1991 | Wakikaido et al. |
| 5,619,649 | A | | 4/1997 | Kovnat et al. |
| 5,709,377 | A | | 1/1998 | Yoshioka et al. |
| 5,903,801 | A | | 5/1999 | Nakamura |
| 5,960,167 | A | * | 9/1999 | Roberts et al. ............. 358/1.15 |
| 6,006,045 | A | | 12/1999 | Miyawaki |
| 6,025,925 | A | * | 2/2000 | Davidson et al. ........... 358/1.15 |
| 6,026,380 | A | | 2/2000 | Weiler et al. |
| 6,064,836 | A | | 5/2000 | Nakamura et al. |
| 6,122,463 | A | | 9/2000 | Nagatani |
| 6,181,893 | B1 | | 1/2001 | Collard et al. |
| 6,184,998 | B1 | * | 2/2001 | Tebeka ...................... 358/1.15 |
| 6,216,113 | B1 | * | 4/2001 | Aikens et al. ................. 705/34 |
| 6,219,151 | B1 | * | 4/2001 | Manglapus et al. ........ 358/1.15 |

(Continued)

OTHER PUBLICATIONS

Business & Technology Editors, Interstar Technologies Launches LightningSAX 7.0; Enterprise Fax Sotrwware Set to Dominate Its Class, Business Wire (New York), Dec. 7, 2000, pp. 1.*

(Continued)

*Primary Examiner*—Matthew S Gart
*Assistant Examiner*—Olusegun Goyea
(74) *Attorney, Agent, or Firm*—Tucker Ellis & West LLP (57) ABSTRACT

A system and method for accounting for document processing operations. Notification data is received from a networked document processing device, which indicates the presence on the network of the document processing device. Accounting data is then communicated to the networked document processing device in response to the notification data. The accounting data facilitates the administration of costs associated with the usage of the networked document processing device. Cost data is then received from the networked document processing device representing the accumulated costs associated with the usage of the document processing device. The cost data is accumulated according to the received accounting data by the networked document processing device.

28 Claims, 4 Drawing Sheets

U.S. PATENT DOCUMENTS

| | | |
|---|---|---|
| 6,247,135 B1 | 6/2001 | Feague |
| 6,301,012 B1 * | 10/2001 | White et al. ............... 358/1.15 |
| 6,424,424 B1 * | 7/2002 | Lomas et al. .............. 358/1.14 |
| 6,618,566 B2 * | 9/2003 | Kujirai et al. ................. 399/79 |
| 7,043,458 B2 * | 5/2006 | Kimura ...................... 705/400 |
| 2001/0056406 A1 * | 12/2001 | Nagoya et al. ................ 705/52 |
| 2002/0097421 A1 * | 7/2002 | Lomas et al. .............. 358/1.14 |
| 2003/0005100 A1 * | 1/2003 | Barnard et al. .............. 709/223 |
| 2003/0184794 A1 * | 10/2003 | Stringham et al. ......... 358/1.15 |
| 2005/0275868 A1 * | 12/2005 | Higashiura et al. ......... 358/1.14 |
| 2006/0024115 A1 * | 2/2006 | Komatsu .................... 400/613 |
| 2006/0065715 A1 * | 3/2006 | Kojima et al. ............... 235/380 |

OTHER PUBLICATIONS

RightFAX Is The Right Fax Sortware Choice, Nework Computing (Manhasset), Apr. 1, 1995, pp. 34.*

* cited by examiner

SYSTEM AND METHOD FOR DOCUMENT PROCESSING OPERATION ACCOUNTING

CROSS-REFERENCE TO RELATED APPLICATIONS

This application is a continuation-in-part of U.S. patent application Ser. No. 09/970,133, filed Oct. 3, 2001 now U.S. Pat. No. 7,430,605, titled "METHOD OF PRINTER ACCOUNTING MANAGEMENT".

BACKGROUND OF THE INVENTION

This invention is directed to a system and method for print function management. More particularly, this invention is directed to a system and method for departmental accounting of document processing resources as used with a network or other configuration wherein one or more document processing devices are shared between multiple computer users.

Shared network document processing configurations are common in many offices and other commercial establishments. It has become popular to incorporate a combined printer, scanner, facsimile machine and photocopier in a single unit. Such devices include a controller, which includes an onboard processor and memory for managing the print function. The controller receives commands from the print driver associated with the user's personal computer and accordingly queues jobs for document processing operations over the combined unit.

In order increase efficiency by reducing uncharged photocopying, many offices have implemented an accounting system whereby a departmental or other type account code must be entered into the photocopier prior to enable the copy function. The copier retains a set of codes, which can be department codes or other type access codes. These codes can be maintained on-board the copier in memory or can be accessed through the network. In order to enforce the code at the copier level, it must be enabled by entering a valid department code for every copy job before the copy operation is enabled. Upon entry of a valid code, the copier function is enabled. Thus, validation is performed prior to enabling the copy request.

The printer function is different from the copy function in that validation and print enabling must occur after the print request. When requesting a print job from a personal computer, a print command is issued from a menu. The printer driver activates a dialog box that is displayed to offer a selection of print options. The printer dialog can include an input field for entering a departmental code. After entry, an acceptance command is entered in order to instruct the printer driver to send the print job with the desired selections to the printer controller. If a valid code is entered, the print function will be enabled and the print job will be charged to the department. However, if an invalid code is entered, the charge is directed to an undefined account and the print job will not print. The user may be unaware that an invalid code has been entered. Also, the user is not timely notified that service has been denied due to an invalid code. This can result in waiting at a printer for a print job that does not proceed, resulting in wasted time and user inconvenience. This problem can be especially exacerbated if the source file is closed or is otherwise unavailable for resubmission of the print request.

In large operating environments, a dedicated server is implemented to facilitate the validation of the department codes. In smaller environments, validation of department codes is accomplished by the individual document processing devices. When a new document processing device is added, in either circumstance, the department codes must be input manually by a system administrator and then initialized. In the case of a server, the administrator must upload the appropriate changes to the server and at the device. In the smaller environment, setup must occur at the device itself. This represents a time-consuming undertaking. In addition, when changes are made to the department codes, each device must be updated to reflect the changes. This requires large amounts of time by the system administrator to update each of the devices.

There is a need for a system and method for accounting for document processing operations.

SUMMARY OF THE INVENTION

In accordance with the present invention, there is provided a system and method for document processing.

Further, in accordance with the present invention, there is provided a system and method for departmental accounting of document processing resources as used with a network or other configuration wherein one or more document processing devices are shared between multiple computer users.

Still further, in accordance with the present invention, there is provided a system and method for automated accounting of document processing operations.

Still further, in accordance with the present invention, there is provided an accounting system for document processing operations. The system includes receiving means adapted for receiving notification data from a networked document processing device. The notification data functions to indicate the active network presence of the document processing device. The system also includes communications means adapted to communicate, in response to the notification data, accounting data. The accounting data facilitates the administration of costs associated with usage of the document processing device. The system further includes receiving means adapted to receive, from the document processing device, usage cost data, accumulated according to the accounting data, associated with the document processing device.

Still further, in accordance with the present invention, there is provided an accounting method for document processing operations. The method begins by receiving notification data from a networked document processing device. The notification data indicates the presence on the network of the document processing device. Accounting data is then communicated to the networked document processing device in response to the notification data. The accounting data facilitates the administration of costs associated with the usage of the networked document processing device. Cost data is then received from the networked document processing device representing the accumulated costs associated with the usage of the document processing device. The cost data is accumulated according to the received accounting data by the networked document processing device.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention.

Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description, serve to explain the principles of the invention.

DETAILED DESCRIPTION OF THE PREFERRED EMBODIMENT

The present invention is directed to there is provided an accounting system and method for document processing operations. More particularly, the present invention is directed to an automated system and method for providing accounting data corresponding to networked document processing devices.

Figure 1:
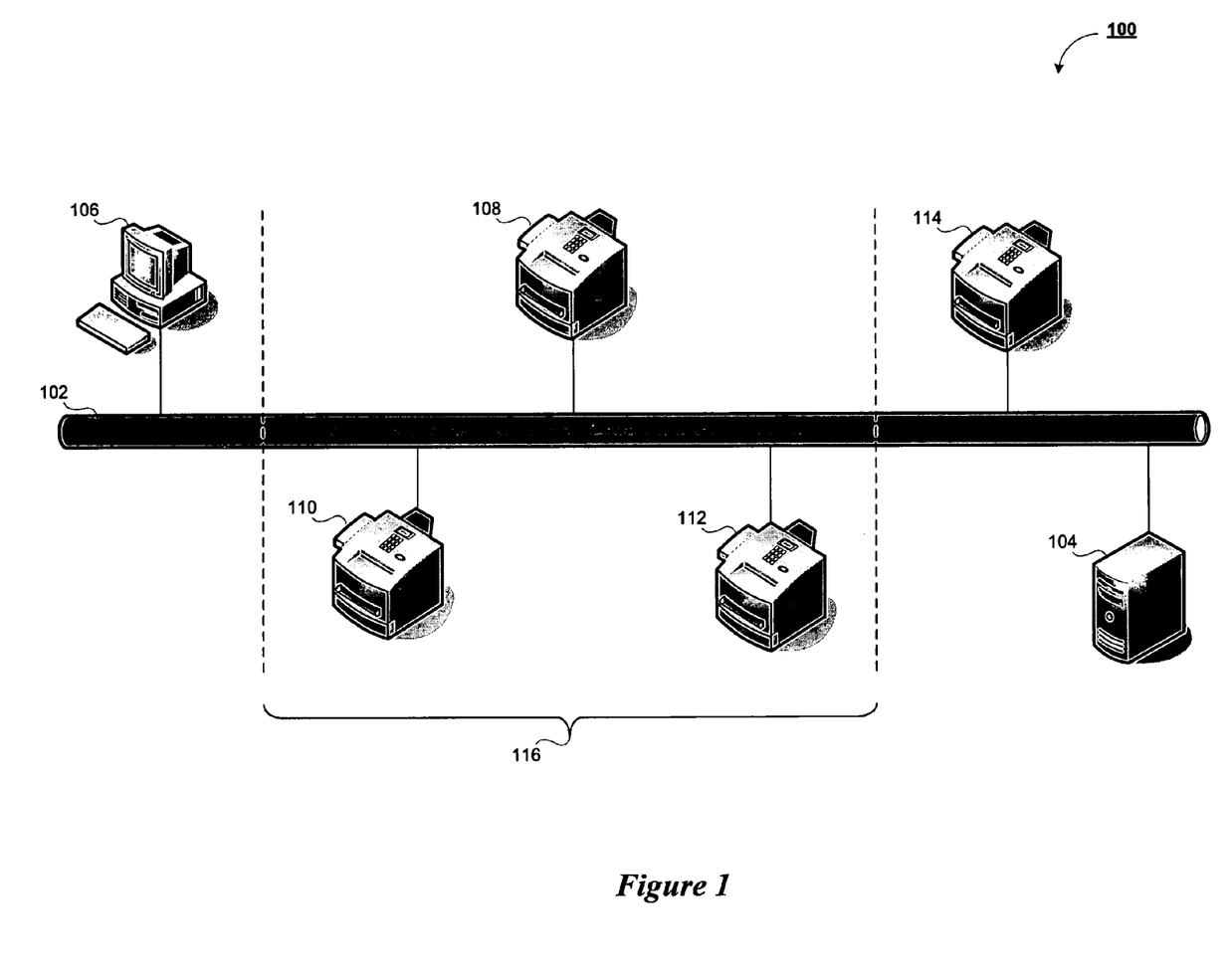
FIG. 1 is a block diagram illustrating a system in accordance with the present invention.

Turning now to FIG. 1, there is shown a diagram illustrating the system 100 in accordance with the present invention. Preferably, the system 100 is implemented in an office environment, having a variety of departments, groups, divisions, and the like. Each department of the environment has a unique department code, used to facilitate the tracking of resource usage, such as copies made, faxes sent, scans made, print jobs outputted, and the like. As shown in FIG. 1, the system 100 suitably includes a computer network 102. As will be appreciated by those skilled in the art, the computer network is any type of computer network known in the art, including the Internet, local area network, wide area network, and the like. The network 102 is suitably adapted to enable communication between a variety of electronic devices, illustrated in FIG. 1 as a server 104, a user input device 106, and document processing devices 108, 110, 112, and 114, using any communications link known in the art. As will be understood by those skilled in the art, the communications link is any means for communication between electronic devices, including for example and without limitation, an Ethernet based network, infrared connection, Wi-Fi connection, telephone connection, cellular connection, Bluetooth connection and the like or any combination of communication means thereof.

The user device 106 is any personal computing device known in the art. Preferably, the user device 106 is a personal computer communicatively coupled to the network 102 and in data communication with the server 104 and the document processing devices 108-114. Those skilled in the art will appreciate that the document processing devices are any suitable document processing devices known in the art, such as a copier, printer, scanner, facsimile, multifunction peripheral, and the like, or any combination thereof. Suitable commercially available document processing devices include, but are not limited to, the Toshiba e-Studio Series Controller. Preferably, the devices 108-114 are advantageously multifunction peripheral devices capable of performing a variety of document processing operations. The server 104 of the system 100 illustrated in FIG. 1 suitably facilitates the operations of the network 102. It will be understood by htose skilled in the art that the network 102 is capable of being implemented without using a server.

In accordance with the present invention, a user via the user device 106 is prompted to input a department code for each document processing request submitted over the network 102 to the document processing devices 108-114. In the preferred embodiment, the department codes are stored in an associated memory on document processing devices 108-114. More preferably, the department codes are stored on the document processing devices 108-114 in associated memory, accessible by the document processing devices 108-114 during document processing operations via any means known in the art. In an alternate embodiment, the department codes are stored on the server 104. As each job is submitted to the document processing devices 108-112, the department code accompanying the job is validated by comparing the received code to a list or table of codes present on the receiving device. When invalid department codes are received, the job is sent to an invalid queue and the user is notified of the invalid code. When the department code is validated, the document processing device commences accounting the document processing operation to the department corresponding to the type of document processing job. Thus, each copy job, fax job, scan job, or print job incurs a corresponding cost, which is then charge to the department represented by the department code.

As shown in FIG. 1, the document processing devices 108-112 are advantageously arranged in a group 116. In accordance with the present invention, the group 116 suitably comprises those document processing devices 108-112 having the same or similar attributes. The skilled artisan will appreciate that the same or similar attributes includes, but is not limited to, the same model or series of devices, the same features, processors, controllers, and the like. When a new document processing device 114 is added to the network 102, the new document processing device requires the existing department codes to be installed. In accordance with the present invention, the new document processing device 114 broadcasts over the network 102 its corresponding attributes. When other devices are present on the network 102 having the same or similar attributes, an identification of the group 116 is sent to the document processing device 114 by at least one of the devices 108-112 in the group 116. As shown in FIG. 1, the group 116 has the same or similar attributes of the new document processing device 114 and the subnet identification of the group 116 is transmitted to the new device 114.

The new device 114 then submits a request to join the group 116 over the network 102. Upon acceptance of the new device 114, the department codes are sent to the new device 114 by at least one of the devices 108-112 already belonging to the group 116. The new device 114 then stores these codes in associated memory and initializes the memory to begin document processing operations. It will be understood by those skilled in the art that such a process bypasses the need for an administrator to manually load the department codes to the new device 114. In one embodiment, the server 104 facilitates the uploading of department codes to the new device 114. For example, when the new device 114 receives an indication from at least one of the devices 108-112 of the group 116 that each of the devices 108-112 in the group 116 have the same or similar attributes, the new device 114 submits a request to the server 104 for department code data. The server 104 then uploads the department codes to the new device 114, which initializes an internal memory of department codes and is thereby ready to perform document processing operations.

In the preferred embodiment, costs incurred by the document processing operations are stored on the server 104 by department code. The present invention is also capable of storing each charge incurred on the document processing devices 108-114, thereby obviating the need for a server 104. It will be appreciated that the lack of a server 104 on the network 102 will not negate the effectiveness of the present invention. The inclusion of the server 104 in FIG. 1 is for exemplification purposes only, and the present invention is capable of implementation in the absence of such a server 104.

Figure 2:
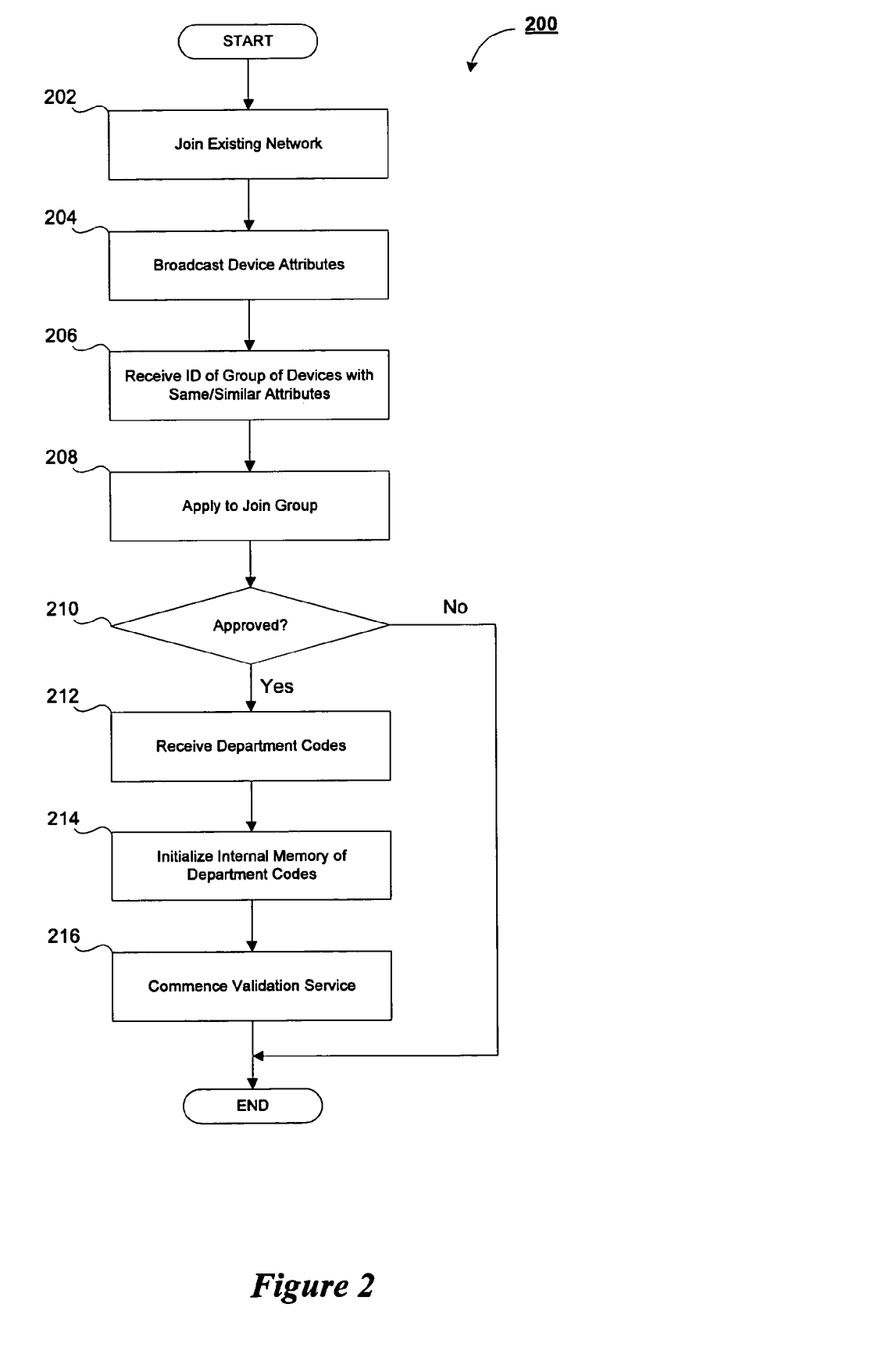
FIG. 2 is a flow chart illustrating an automated accounting method in accordance with the present invention.

The foregoing description of the system 100 of FIG. 1 will better be understood in conjunction with the flow charts depicted in FIGS. 2, 3, and 4, discussed below. Turning now to FIG. 2, there is shown a flow chart 200 illustrating the addition of a document processing device 114 to the network 102. Beginning at step 202, the new document processing device 114 is communicatively connected to the network 102. As will be understood by those skilled in the art, the document processing device 114 suitably connects to the network 102 using any means known in the art, including and without limitation, an internal network interface card. The device 114 then broadcasts, at step 204, its device attributes. For example, upon connecting to the network, the device 114 broadcasts its manufacturer, model number, series number, family and the like. The group 116 of devices 108-112 have the same attributes or, alternatively, have similar attributes as that of the device 114. It will be appreciated by those skilled in the art that similar attributes, according to the present invention, include the same series but different model of device, the same family but different model, and the like. The skilled artisan will understand that the similar attributes are also capable of being implemented as each device having the same programming language operating thereon.

The new device 114 then receives at step 206 an identification of the group 116 of devices 108-112 having the same or similar attributes from at least one of the devices in the group 116. In the preferred embodiment, a lead device in the group 116 transmits the identification. In another embodiment, at least one of the devices 108-112 transmits the identification. In accordance with the present invention, the identification is capable of including, without limitation, a subnet ID referencing the group 116, the IP addresses of each device 108-112, the MAC addresses of each device 108-112, and the like. The new device 114 then applies to join the group 116 via any means known in the art at step 208. It will be appreciated by those skilled in the art that joining the group 116 suitably involves authentication and authorization processes known in the art. A determination is then made at step 210 whether the new device 114 is approved to join the group 116. When the device 114 is accepted to join the group 116, the new device 114 receives data representing the various department codes then in effect on the network 102. Preferably, the department codes are received in the form of a lookup table. When the device 114 is not approved, the process terminates and the department codes must be uploaded by a system administrator manually.

Once the new device 114 has received the department codes, the device 114 suitably initializes its own lookup table with the department code data at step 214. The device 114 is then ready to begin document processing operations and initiates the department code validation service at step 216. In accordance with the present invention, when the user device 106 submits a document processing job via the network 102 to one of the devices 108-114 belonging to the group 116, a department code is submitted in along with the document processing request. The document processing device, for example, device 114, receives the document processing request and determines whether the accompanying department code is valid. The code is compared to the codes in the associated memory of the device 114 and when the code is valid, the document processing operation is performed and the department account is charged. In one embodiment, validation of the document processing request is performed by the server 104. It will be understood by those skilled in the art that the present invention enables the management of the devices 108-114 as a group, instead of requiring individual management.

Figure 3:
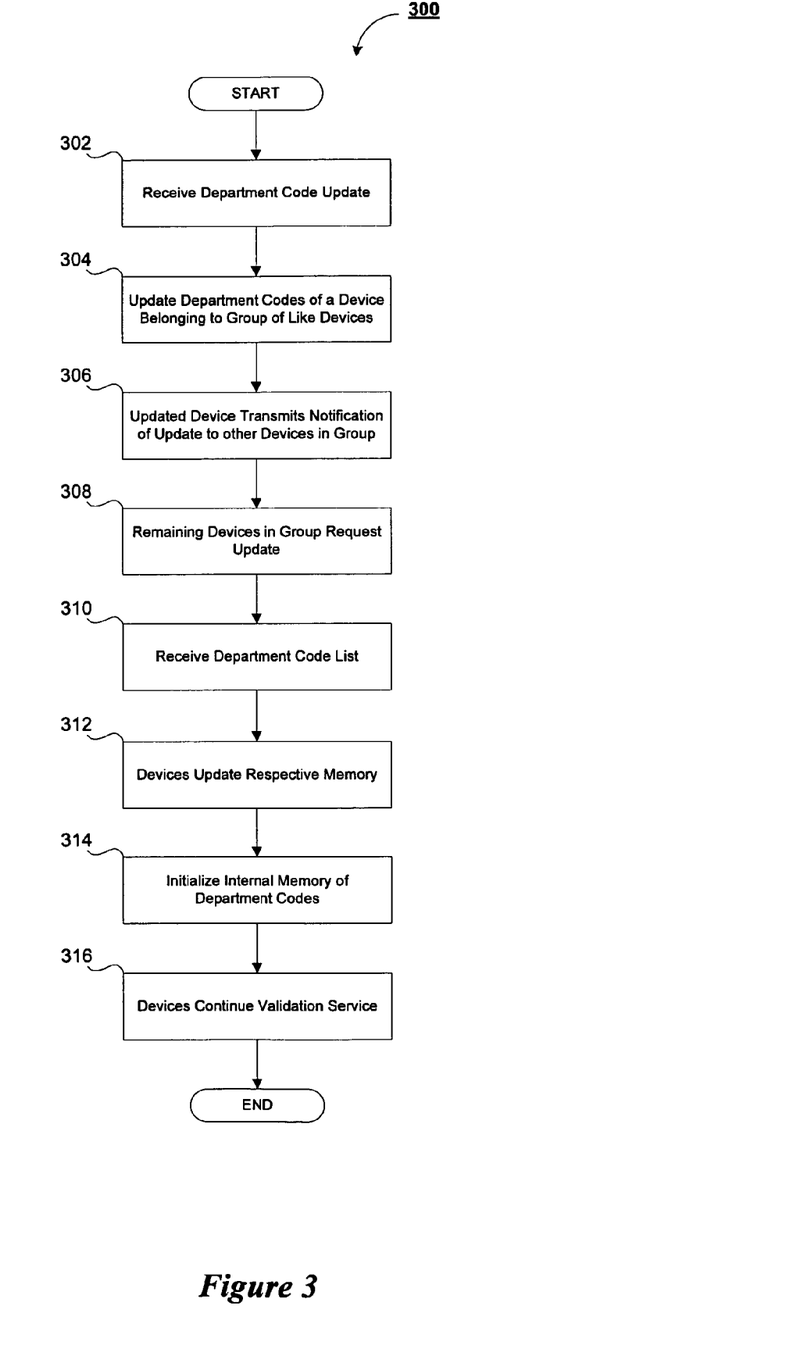
FIG. 3 is a flow chart illustrating an accounting method in accordance with the present invention.

Turning now to FIG. 3, there is shown a flow chart 300 illustrating a department code update method in accordance with the present invention. As shown in FIG. 3, one of the devices 108-114 in the group 116 receives an updated set of department codes at step 302. The updated set of codes is capable of being manually input at the device by an authorized user, or alternatively, uploaded by the server 104 to the device. For purposes -of example, device 110 of the group 116 received the department code update at step 302. At step 304, the document processing device 110 updates its associated memory with the new department code data. The updated device 110 then transmits a notification at step 306 that an update has been received to the other devices 108, 112-114 in the group 116. It will be appreciated by those skilled in the art that such an update is suitably a broadcast directed to the subnet corresponding to the group 116. It will further be appreciated by the skilled artisan that any other means of providing notification to the remaining members of the group 116 are capable of being employed by the device 110, without departing from the scope of the present invention.

Once notification has been sent at step 306, flow proceeds to step 308, wherein the remaining devices 108, 112-114 in the group 116 request an update of department codes. In accordance with the present invention, the update data is capable of being transmitted from the updated device 110, the server 104, the user device 106, or any other device advantageously connected to the network 102 and capable of communicating update data to the document processing devices 108-114. In the preferred embodiment, the request is received by the updated device 110, which then transmits the updated department codes to the remaining devices 108, 112-114. In one embodiment, the request is received by the entity which originally updated the device 110, for example the server 104. Continuing with this example, the server 104 receives the update request and transmits the update data to remaining devices 108, 112-114, without requiring the system administrator or authorized user to interact with the update process.

The remaining devices 108, 112-114 then receive the update department codes at step 310. It will be appreciated by those skilled in the art that the updated department codes are received over the network 102 via any suitable transmission means known in the art. Once the remaining devices 108, 112-114 have received the update data, each device updates its associated memory with the new or modified department codes received with the update data at step 312. The remaining devices 108, 112-114 then each initialize its respective internal lookup tables at step 314 and continue performing document processing operations at step 316.

Figure 4:
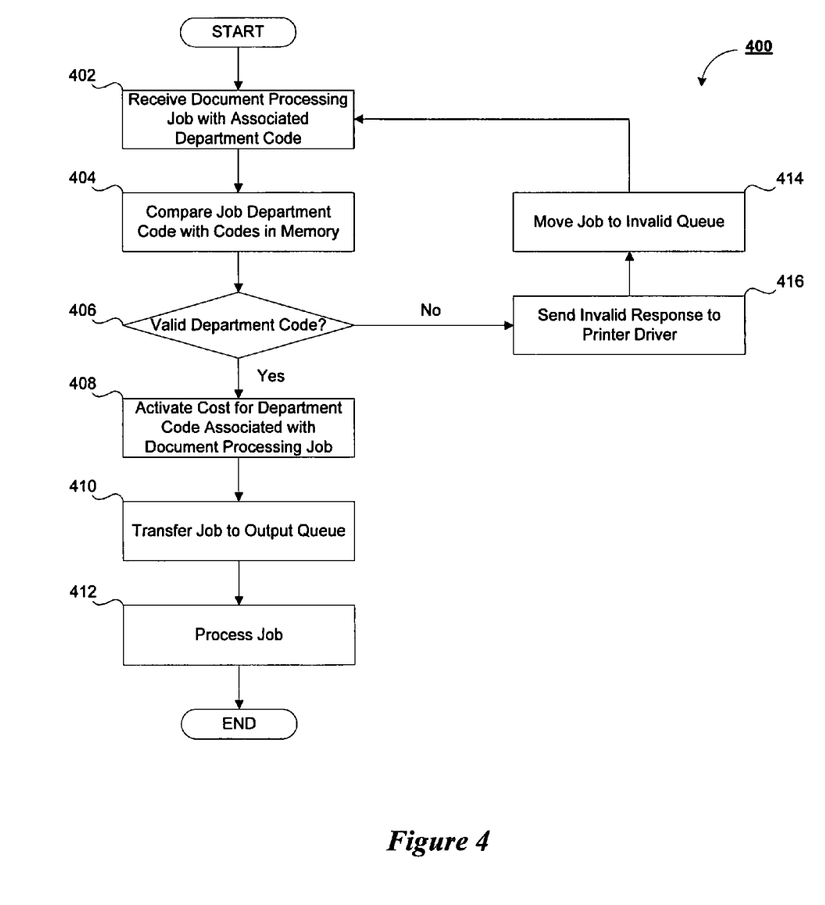
FIG. 4 is a flow chart illustrating an accounting method in accordance with the present invention.

Referring now to FIG. 4, there is shown a flow chart 400 illustrating a document processing operation performed by one of the document processing devices 108-114 of the system 100. A document processing device 108 receives a document processing job with an associated department code at step 402. Preferably, the document processing job is transmitted to the document processing device 108 from a user device 106. It will be appreciated by those skilled in the art that document processing jobs are equally capable of being initiated directly at the document processing device 108, via a suitable user interface panel. In either event, a department code is associated with the received document processing job.

In accordance with the present invention, the department code corresponds to an instruction to calculate the costs associated with the document processing job to a specific department, organization, person, and the like. At step 404, the department code received with the document processing job is compared to the department codes residing in the associated memory. Preferably, the department codes in the associated memory are maintained on the device 108, however such memory is equally capable of residing on one or more personal computers, such as user device 106, or maintained over the network 102.

A determination is then made at step 406 whether the department code received is valid. Those skilled in the art will appreciate that a valid code is a code which resides in the associated memory and is capable of incurring additional costs. When the department code submitted with the document processing job is invalid, flow proceeds to step 416, wherein notification is sent to the printer driver of the invalid response. It will be understood by those skilled in the art the printer driver denotes a software application residing on the device from which the document processing request originated. In the case of the document processing job received over the network 102, the device 108 transmits notification back to the user device 106 of the invalid code via the printer driver on the user device 106. When, for instance, the device 108 is the originating source of the document processing request, the printer driver of the device 108 suitably displays the notification on the device 108 user interface. In both circumstances, the document processing job is then sent to an invalid job queue at step 414 and the process returns to step 402 to await the next document processing job.

When the department code received with the document processing job is valid, flow proceeds to step 408, wherein a charge for the department code associated with the document processing job is activated. As will be apparent to those skilled in the art, the device 108 stores in memory the costs associated with the document processing job. In one embodiment, the memory is suitably located on the server 104 and the charges associated with the cost are transmitted to the server 104 via the network 102. In a preferred embodiment, the charges are stored on the device 108 internal storage. The document processing job is then transferred to an output queue at step 410 for output thereon by the device 108 in accordance with the document processing operation corresponding to the job. The document processing job is subsequently processed by the device 108 at step 412.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. An accounting system for document processing operations comprising:
   means for placing a networked document processing device in data communication with a data network;
   means for generating a network broadcast, which network broadcast includes device attribute data corresponding to functional attributes of the document processing device, from the networked document processing device to the data network;
   testing means responsive to the network broadcast for testing for a peer relationship between a previously installed network device setup relative to the network document processing device
   means for communicating with the associated networked document processing device, accounting data corresponding to the tested peer relationship, which accounting data facilitates administration of costs associated with usage of the networked processing device;
   means for receiving, from the networked document processing device, cost data corresponding to a tested peer relationship, which cost data is representative of cost associated with usage thereof, which cost data is accumulated in accordance with accounting data communicated thereto;
   means for receiving a plurality of document processing requests from each of a corresponding plurality of workstations, each document processing request including an associated charge code;
   means for processing each of the plurality of document processing requests at the networked document processing device; and
   means for calculating costs and storing the calculated costs locally at the networked document processing device relative to each of the plurality of document processing requests in accordance with the charge code and the accounting data communicated thereto.

2. The accounting system for document processing operations of claim 1 further comprising validation means for validating the associated networked document processing device prior to communicating accounting data thereto.

3. The accounting system for document processing operations of claim 1 further comprising means for periodically communicating update data with the networked document processing device.

4. The accounting system for document processing operations of claim 3 wherein the update data includes updated accounting data.

5. The accounting system for document processing operations of claim 3 wherein the update data includes data representative of a changed state of at least one other networked document processing device.

6. The accounting system for document processing operations of claim 1 wherein the accounting data includes at least one data item from the group consisting of accounting codes, department codes, job charges and user identification codes.

7. The accounting system for document processing operations of claim 1 further comprising means for receiving setup data associated with the networked document processing device prior to communication of accounting data thereto.

8. An accounting method for document processing operations comprising the steps of:
   placing a networked document processing device in data communication with a data network;
   generating a network broadcast, which network broadcast includes device attribute data corresponding to functional attributes of the document processing device, from the networked document processing device to the data network;
   testing, in response to the network broadcast, for a peer relationship between a previously installed network device setup relative to the networked document processing device;
   communicating with the associated networked document processing device, accounting data corresponding to the tested peer relationship, in response to received notification data, which accounting data facilitates administration of costs associated with usage of the networked processing device;
   receiving, from the networked document processing device, cost data corresponding to a tested peer relationship, which cost data is representative of cost associated with usage thereof, which cost data is accumulated in accordance with accounting data communicated thereto;
   receiving a plurality of document processing requests from each of a corresponding plurality of workstations, each document processing request including an associated charge code;
   processing a plurality of document processing requests at the networked document processing device; and
   calculating costs and storing the calculated costs locally at the networked document processing device relative to each of the plurality of document processing requests in accordance with the charge code and the accounting data communicated thereto.

9. The accounting method for document processing operations of claim 8, further comprising the step of validating the associated networked document processing device prior to communicating accounting data thereto.

10. The accounting method for document processing operations of claim 8, further comprising the step of periodically communicating update data with the networked document processing device.

11. The accounting method for document processing operations of claim 10, wherein the update data includes updated accounting data.

12. The accounting method for document processing operations of claim 10, wherein the update data includes data representative of a changed state of at least one other networked document processing device.

13. The accounting method for document processing operations of claim 8, wherein the accounting data includes at least one data item from the group consisting of accounting codes, department codes, job charges and user identification codes.

14. The accounting method for document processing operations of claim 8, further comprising the step of receiving setup data associated with the networked document processing device prior to communication of accounting data thereto.

15. A computer-readable medium with computer-readable instructions stored thereon for accounting of document processing operations comprising:
   instructions for placing a networked document processing device in data communication with a data network;
   instructions for generating a network broadcast, which network broadcast includes device attribute data corresponding to functional attributes of the document processing device, from the networked document processing device to the data network;
   instructions for testing, responsive to the network broadcast, for testing for a peer relationship between a previously installed network device setup relative to the networked document processing device;
   instructions for communicating with the associated networked processing device, accounting data corresponding to the tested peer relationship, in response to received notification data, which accounting data facilitates administration of costs associated with usage of the networked processing device;
   instructions for receiving, from the networked processing device, cost data corresponding to a tested peer relationship, which cost data is representative of cost associated with usage thereof, which cost data is accumulated in accordance with accounting data communicated thereto;
   instructions for receiving a plurality of document processing requests from each of a corresponding plurality of workstations, each document processing request including an associated charge code
   instructions for processing a plurality of document processing requests at the networked document processing device; and
   instructions for calculating costs and storing the calculated costs locally at the networked document processing device relative to each of the plurality of document processing requests in accordance with the charge code and the accounting data communicated thereto.

16. The computer-readable medium of instructions with computer-readable instructions stored thereon for accounting of document processing operations of claim 15, further comprising instructions for validating the associated networked document processing device prior to communicating accounting data thereto.

17. The computer-readable medium of instructions with computer-readable instructions stored thereon for accounting of document processing operations of claim 15, further comprising instructions for periodically communicating update data with the networked document processing device.

18. The computer-readable medium of instructions with computer-readable instructions stored thereon for accounting of document processing operations of claim 17, wherein the update data includes updated accounting data.

19. The computer-readable medium of instructions with computer-readable instructions stored thereon for accounting of document processing operations of claim 17, wherein the update data includes data representative of a changed state of at least one other networked document processing device.

20. The computer-readable medium of instructions with computer-readable instructions stored thereon for accounting of document processing operations of claim 15, wherein the accounting data includes at least one data item from the group consisting of accounting codes, department codes, job charges and user identification codes.

21. The computer-readable medium of instructions with computer-readable instructions stored thereon for accounting of document processing operations of claim 15, further comprising instructions for receiving setup data associated with the networked document processing device prior to communication of accounting data thereto.

22. A computer-implemented accounting method for document processing operations comprising the steps of:

placing a networked document processing device in data communication with a data network;

generating a network broadcast, which network broadcast includes device attribute data corresponding to functional attributes of the document processing device, from the networked document processing device to the data network     testing, in response to the network broadcast, for a peer relationship between a previously installed network device setup relative to the networked document processing device;

communicating with the associated networked processing device, accounting data corresponding to the tested peer relationship, in response to received notification data, which accounting data facilitates administration of costs associated with usage of the networked processing device;

receiving, from the networked processing device, cost data corresponding to a tested peer relationship, which cost data is representative of cost associated with usage thereof, which cost data is accumulated in accordance with accounting data communicated thereto;

receiving a plurality of document processing requests from each of a corresponding plurality of workstations, each document processing request including an associated charge code;

processing a plurality of document processing requests at the networked document processing device; and     calculating costs and storing the calculated costs locally at the networked document processing device relative to each of the plurality of document processing requests in accordance with the charge code and the accounting data communicated thereto.

23. The computer-implemented accounting method for document processing operations of claim 22, further comprising the step of validating the associated networked document processing device prior to communicating accounting data thereto.

24. The computer-implemented accounting method for document processing operations of claim 22, further comprising the step of periodically communicating update data with the networked document processing device.

25. The computer-implemented accounting method for document processing operations of claim 24, wherein the update data includes updated accounting data.

26. The computer-implemented accounting method for document processing operations of claim 24, wherein the update data includes data representative of a changed state of at least one other networked document processing device.

27. The computer-implemented accounting method for document processing operations of claim 22, wherein the accounting data includes at least one data item from the group consisting of accounting codes, department codes, job charges and user identification codes.

28. The computer-implemented accounting method for document processing operations of claim 22, further comprising the step of receiving setup data associated with the networked document processing device prior to communication of accounting data thereto.

\* \* \* \* \*